No. 772,762. PATENTED OCT. 18, 1904.
A. E. VROOMAN.
VEGETABLE TOPPING MACHINE.
APPLICATION FILED APR. 17, 1903.
NO MODEL.
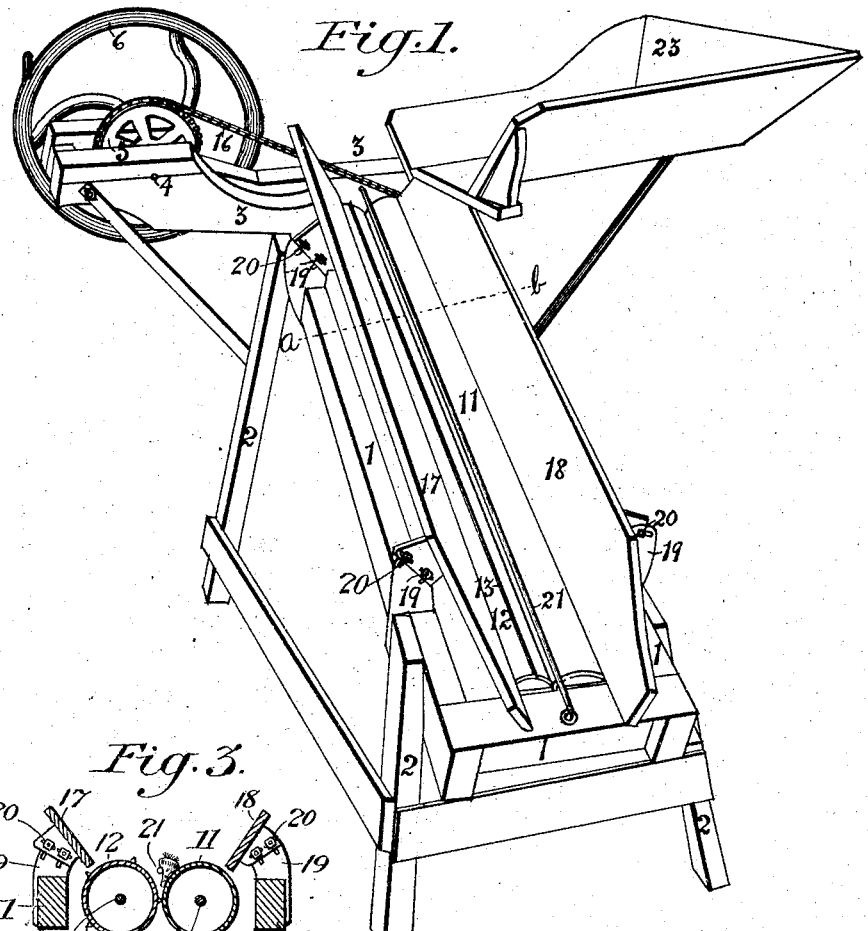
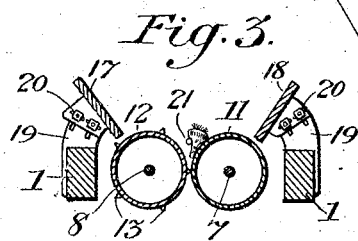
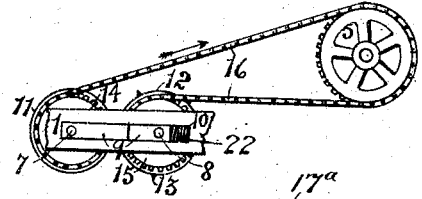
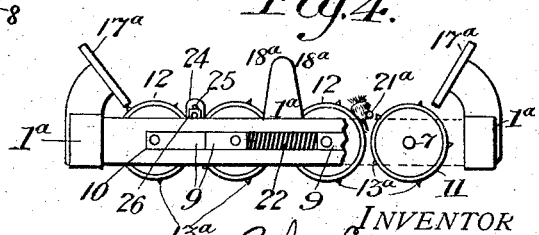
WITNESSES:
Walt Young
G. A. Officer
INVENTOR
Arba E. Vrooman
BY
Obed C. Billman Attorney No. 772,762.  Patented October 18, 1904.

UNITED STATES PATENT OFFICE.

ARBA E. VROOMAN, OF PAINESVILLE, OHIO.

VEGETABLE-TOPPING MACHINE.

SPECIFICATION forming part of Letters Patent No. 772,762, dated October 18, 1904.

Application filed April 17, 1903. Serial No. 153,073. (No model.)

*To all whom it may concern:*

Be it known that I, ARBA E. VROOMAN, a citizen of the United States, residing at Painesville, in the county of Lake and State of Ohio, have invented a new and useful Improvement in Vegetable-Topping Machines, of which the following is a specification.

My invention relates to a machine especially adapted for removing the tops from onions or other vegetables.

Experienced growers of onions find that the same should not all be topped the same length; but the length of the stem left on the onion should be in proportion to the size of the onion for two reasons, viz: First, they have a better appearance for market; second, if a sufficient length of stem is not left on the onion the air gets into the bulb of the same and causes it to grow and rot.

The object of my invention is, therefore, to provide a machine which will expeditiously and cleanly remove the tops from the vegetables without bruising or otherwise injuring them and which will top the large and small vegetables in such a manner that the length of the stem left remaining on the vegetable will be in exact proportion to the size of the vegetable.

Another object of the invention is to construct a machine for the purpose described which will be exceedingly perfect, simple, durable, and economic and in which the various parts of the machine requisite for the work may be expeditiously and conveniently adjusted to meet all requirements.

In my patents numbered and dated, respectively, No. 580,742, April 13, 1897, and No. 676,549, June 18, 1901, I have shown a device for holding and supporting the vegetables to be topped in such a manner that the large and small vegetables will be topped in such a way that the length of the stem left remaining on the vegetable will be in proportion to the size of the vegetable. This device comprised, respectively, in said patents "a trough running over the rollers, the trough having a longitudinal opening in its lower portion leading directly to the space between the rollers, by which trough the vegetables are held, so that only their tops may engage the rollers," and "a vegetable-trough immediately above the cylinders, said trough having one of its side walls movable to and from the revoluble bar and to and from the revoluble cylinder, whereby to regulate the opening wherethrough the vegetable-tops are carried by the cylinder and to regulate the topping of the vegetables."

In my application for Letters Patent, filed November 3, 1902, Serial No. 129,833, I have shown a double-feed "vegetable-topping machine" comprising various devices and improvements, paramount, among which is a "vegetable-supporting trough for holding the vegetables to be topped directly over the cutting device, whether shears, choppers, revolving blades" or other suitable and convenient cutting device. I have also shown a "revoluble feeding-cylinder and a revoluble cylinder provided with a series of cutters formed integral therewith or securely attached thereto" instead of a "revoluble bar presenting cutting edges."

The paramount object of this invention is to still further improve my said inventions by increasing their capacity, efficiency, &c., as follows, viz: by providing a simple, new, and improved device for supporting and holding the vegetables to be topped directly over the cutting and feeding cylinders, which will provide two openings or spaces wherethrough the vegetable-tops are carried by the cylinders, and to regulate the topping of the vegetables, and which will permit of the use of cutting knives or blades on both cylinders making them practically "cutting and feeding cylinders." This device is known as a "vegetable-supporting rod," hereinafter more fully described.

With these ends in view the invention consists in the novel construction hereinafter described, illustrated in the accompanying drawings, and particularly pointed out in the appended claims.

Referring now to the drawings forming a part of this specification, Figure 1 is a perspective view of a "hand-power machine" constructed in accordance with my invention. Fig. 2 is a front detail view of the machine, showing the manner in which motion is transmitted to the cylinders by means of a sprocket-chain and sprocket-wheels. Fig. 3 is a sectional view of the machine, taken on line *a b* of Fig. 1. Fig. 4 is a front elevation of a double-cylinder machine provided with stationary side boards and adjustable vegetable-supporting rods and having all cylinders provided with knives or cutters.

Similar characters of reference indicate like parts throughout all the figures of the drawings.

In the accompanying drawings, 1 designates the inclined main frame of the machine, mounted in the present instance on suitable legs or standards 2 and provided at its upper or front end with two transverse horizontal beams 3. Mounted in suitable bearings near the ends of these beams 3 is a drive-shaft 4, having mounted thereon and carrying intermediate the said beams a main driving sprocket-wheel 5. Upon the end of the drive-shaft 4 there is mounted a crank-wheel 6, by means of which the same is rotated.

7 and 8 designate, respectively, drive-shafts mounted in suitable bearing-blocks 9, slidably mounted in recesses or openings 10 of the ends of the main frame 1 of the machine, and which said drive-shafts carry, respectively, the revoluble feeding-cylinder 11 and cutting-cylinder 12. The revoluble cutting-cylinder 12 is provided with a series of cutters or knives 13, formed integral therewith or securely attached thereto.

To the upper or front ends of the revoluble feeding-cylinder 11 and cutting-cylinder 12 there are mounted sprocket-wheels 14 and 15, respectively, to which motion is imparted by means of a sprocket-chain 16 passing over them in the manner shown in Fig. 2 and over the main driving sprocket-wheel 5, hereinbefore referred to.

17 and 18 designate, respectively, side boards or walls of a vegetable-trough parallel with and in close proximity to the inclined revoluble feeding-cylinder 11 and cutting-cylinder 12. These side boards or walls 17 and 18 are adjustably mounted in the present instance to the sides of the main frame 1 of the machine by means of supporting-arms 19, provided with suitable slots and adjusting-bolts 20.

When the vegetables are very green and tender, the side boards or walls 17 and 18 are adjusted so that the bodies of the vegetables will not come in contact with the cylinders and only permitting the tops to be engaged thereby, thus preventing the peeling or bruising of the bulb of the vegetables when the tops are severed therefrom.

21 designates a vegetable-supporting rod mounted and secured at its ends to the upper and lower ends of the inclined main frame of the machine and mounted immediately above the meeting perimeters of the adjacent revoluble feeding-cylinder 11 and cutting-cylinder 12. This vegetable-supporting rod 21 is designed to hold and support the vegetables to be topped directly over the meeting perimeters of the feeding and cutting cylinders 11 and 12 and provides two openings or spaces on each side wherethrough the vegetable-tops are carried by the cylinders and to regulate the topping of the vegetables.

In order to elastically hold the cutters or knives 13 of the revoluble cutting-cylinder 12 in contact with the revoluble feeding-cylinder 11 and provide for the requisite vibratory motion while the same are being revolved, a coil-spring 22 is mounted behind the bearing-blocks 9, supporting the ends of the shafts of the cutting-cylinder 12. It should be understood that the bearing-blocks 9 are so mounted and arranged that only the cutters or knives 13 of the revoluble cutting-cylinder 12 are brought into contact with the perimeter of the adjacent feeding-cylinder 11, thus preventing the accumulation and adhesion of dirt, &c., to the feeding and cutting cylinders.

23 designates the feeding-hopper, secured and mounted to the upper portion of the machine, as shown, and designed to feed the vegetables to be topped into the upper portion of the inclined vegetable-trough formed by the side boards or walls 17 and 18.

The bottom of the feeding-hopper 23 may be made of slats, wire-netting, or other suitable material designed to allow all dirt, &c., to pass through the same.

The operation of the invention is as follows: As the crank-wheel is revolved the feeding and cutting cylinders are caused to revolve toward each other, and as the vegetables are drawn from the feeding-hopper the same are enabled to pass to the upper ends of the feeding and cutting cylinders, and over the entire length of said feeding and cutting cylinders the vegetables pass, assisted in their downward course by gravity and the revolution of the feeding and cutting cylinders and the chopping motion of the cutting-cylinders, and as the vegetables are passing downward the same are carried thereby against the vegetable-supporting rod, and the tops of the vegetables are drawn under the same and between the feeding and cutting cylinders and are then chopped off between the same, and the vegetables then free from their tops pass on downward and off from the lower portion of the machine completely severed from their tops.

While I have shown a hand-power machine, it should be understood that a pulley may be substituted for the crank-wheel and the same be connected by a belting with any suitable and convenient source of power. Furthermore, while I have shown but one of the cylinders provided with cutters or knives it should be understood that cutters or knives may, if desired, be provided on the opposite cylinder, making these cylinders both feeding and cutting cylinders. If desired, any number of cylinders may be combined in a single machine and the same provided with any suitable and convenient gearing whereby each pair of cylinders are caused to revolve toward each other.

While I have shown the vegetable-supporting rod permanently mounted and attached to the upper and lower portions of the frame of the machine, it should be understood that any suitable and convenient means may be employed by means of which the same may be raised or lowered and whereby the width of the openings or spaces wherethrough the vegetable-tops are carried by the cylinders may be adjusted to regulate the length of the stems left on the vegetables.

In Fig. 4 I have shown a front elevation of a modification of a vegetable-topping machine constructed in accordance with my invention, showing two sets of cylinders, all of which are provided with cutters or knives 13$^a$ and in which the side boards or walls 17$^a$ and 18$^a$ are stationary and permanently attached to the sides and ends 1$^a$ of the machine. It will be seen that the two side boards 18$^a$ form one central dividing-partition securely attached to the ends 1$^a$ of the machine. The vegetable-supporting rod 21$^a$ is adjustably mounted and secured at its ends to the ends of the frame 1$^a$ of the machine by means of supporting-arms 24, secured thereto and having vertical slots 25, through which the ends of the rod 21$^a$ pass and which is adjusted and secured in any desired position by means of adjusting-nuts 26.

Any suitable gearing may be provided whereby the cylinders comprised in each set may be caused to revolve toward each other, and any suitable means may be employed whereby the same may be attached to any suitable source of power.

It should be understood that when all the cylinders are provided with cutters or knives, making them practically both "feeding and cutting cylinders," the adjustable side boards may be so adjusted as to cover the cylinders sufficiently as not to allow the onion to come into contact with the cutters, leaving only the tops to come into contact therewith and be drawn through between the rod and cylinders.

It will be observed that by the use of my vegetable-supporting rod the capacity of my machine is nearly doubled, for the reason that there are two openings or spaces, one on each side of the rod, for the tops to pass through to the cutters, while in the patents heretofore granted to me only one opening is shown through which the tops pass to the cutting device.

Having thus described my invention, what I claim, and desire to secure by Letters Patent, is—

1. A machine for topping vegetables, comprising a revoluble feeding-cylinder and a parallel inclined revoluble cutting-cylinder, means for elastically holding the knives of said cutting-cylinder in contact with said feeding-cylinder, means for revolving said cylinders over and toward each other, side boards or walls adjustably mounted parallel to and in close proximity to said revoluble feeding-cylinder and cutting-cylinder, and a vegetable-supporting rod adjustably mounted immediately above the line of contact of said knives and said revoluble cylinders whereby to regulate the topping of the vegetables.

2. In a machine for topping vegetables, the combination with a pair of parallel inclined revoluble cylinders each carrying a series of cutters or knives, means for elastically holding the cutting edges of said cutters or knives in contact with the perimeter of the adjacent revoluble cylinder, and side boards or walls mounted parallel to and in close proximity to the perimeters of said cylinders; means for revolving said cylinders over and toward each other, of a vegetable-supporting rod mounted immediately above the line of contact of said knives and said cylinders and providing openings or spaces intermediate said rod and cylinders wherethrough the vegetable-tops are carried by the cylinders and to regulate the topping of the vegetables.

In testimony whereof I have hereunto set my hand in the presence of two subscribing witnesses.

ARBA E. VROOMAN.

Witnesses:
 RALPH E. GREGORY,
 GUY WYMAN.